US010862671B2

(12) United States Patent
Leddy

(10) Patent No.: US 10,862,671 B2
(45) Date of Patent: Dec. 8, 2020

(54) GLOBAL OWNERSHIP REGISTRY

(71) Applicant: Visa International Service Association, San Francisco, CA (US)

(72) Inventor: William Leddy, Lakeway, TX (US)

(73) Assignee: Visa International Service Association, San Francisco, CA (US)

(*) Notice: Subject to any disclaimer, the term of this patent is extended or adjusted under 35 U.S.C. 154(b) by 200 days.

(21) Appl. No.: 15/667,265

(22) Filed: Aug. 2, 2017

(65) Prior Publication Data

US 2019/0044700 A1 Feb. 7, 2019

(51) Int. Cl.
*H04L 9/00* (2006.01)
*H04L 9/06* (2006.01)
*G06Q 30/00* (2012.01)
*G06Q 50/18* (2012.01)
*G06Q 20/06* (2012.01)
*H04L 9/32* (2006.01)
*G06Q 20/12* (2012.01)
*G06Q 20/02* (2012.01)
(Continued)

(52) U.S. Cl.
CPC .......... *H04L 9/0637* (2013.01); *G06Q 20/02* (2013.01); *G06Q 20/065* (2013.01); *G06Q 20/12* (2013.01); *G06Q 20/38215* (2013.01); *G06Q 20/42* (2013.01); *G06Q 30/0185* (2013.01); *G06Q 50/184* (2013.01); *H04L 9/3226* (2013.01); *H04L 9/3239* (2013.01); *H04L 9/3247* (2013.01); *G06Q 50/01* (2013.01); *H04L 2209/38* (2013.01); *H04L 2209/56* (2013.01); *H04L 2209/603* (2013.01); *H04L 2209/805* (2013.01)

(58) Field of Classification Search
USPC .......................................... 380/37
See application file for complete search history.

(56) References Cited

U.S. PATENT DOCUMENTS 9,948,467 B2* 4/2018 King ................. H04L 9/3247
2009/0198597 A1* 8/2009 Osterer ............. G06Q 10/087
705/28

(Continued)

OTHER PUBLICATIONS

PCT/US2018/032511, "International Search Report and Written Opinion", dated Sep. 20, 2018, 12 pages.

(Continued)

*Primary Examiner* — Christopher J Brown
(74) *Attorney, Agent, or Firm* — Kilpatrick Townsend & Stockton LLP

(57) ABSTRACT

Described herein is a system in which an electronic record is stored on a distributed environment with respect to an item. In this system, transactions may be conducted for an item in an anonymous fashion. In some embodiments, a first user may input an item identifier associated with an item as well as an indication of an action to be performed with respect to that item. The identifier may be transmitted to a blockchain network, which may use that identifier to locate a blockchain associated with the item. A blockchain may include a series of transaction records associated with the item, each of which is signed using a private key. Upon performance of the indicated action, the blockchain network may generate a new transaction record, append that transaction record to the blockchain, and sign the transaction record.

20 Claims, 6 Drawing Sheets

(51) Int. Cl.
G06Q 20/38 (2012.01)
G06Q 20/42 (2012.01)
G06Q 50/00 (2012.01)

(56) References Cited

U.S. PATENT DOCUMENTS

| | | |
|---|---|---|
| 2011/0302096 A1 | 12/2011 | Lowry |
| 2015/0269570 A1* | 9/2015 | Phan .................. G06Q 20/3276 705/71 |
| 2016/0292672 A1 | 10/2016 | Fay et al. |
| 2016/0292680 A1 | 10/2016 | Wilson et al. |
| 2016/0358158 A1 | 12/2016 | Radocchia et al. |
| 2017/0032358 A1* | 2/2017 | Gibson .............. G06Q 20/4016 |
| 2017/0046664 A1 | 2/2017 | Haldenby et al. |
| 2017/0243283 A1* | 8/2017 | Boston ............... G06Q 30/0611 |
| 2017/0366516 A1* | 12/2017 | Pattanaik .............. H04L 9/3236 |
| 2018/0089735 A1* | 3/2018 | Lenahan ........... G06Q 30/0625 |
| 2019/0130394 A1* | 5/2019 | Stollman .............. G06Q 20/389 |

OTHER PUBLICATIONS

EP18841974.1, "Extended European Search Report", dated Apr. 16, 2020, 9 pages.

\* cited by examiner

GLOBAL OWNERSHIP REGISTRY

BACKGROUND

When users obtain ownership interests in various items, there is a risk that the item will become lost or stolen. Conventional registration systems (e.g., registering the item with the manufacturer, retailer, etc.) may not provide sufficient means to recover those items when this occurs. Users that purchase secondhand goods have no way of determining whether the goods are currently stolen or legitimately owned by the seller. This often puts buyers of secondhand goods at risk of being in possession of stolen property and can stifle secondhand sales. Additionally, there is always a risk that providing personal information to an untrusted party (e.g., in such a secondhand sale) may expose that information to abuse.

Current registration systems for products are also cumbersome and purchasers of those products often don't use them, because of the large number of inconvenient steps needed to register items. For example, a conventional item registration system may request that a user fill out a paper or online form. The form may be relatively long, and the length of the form can deter a person from entering any data into it. After filling out the form, the user sends the information back to the item registry. While such registries are suitable for warranty or recall notifications, they are slow and difficult to use, and they cannot be used by third parties who may need to access the information.

Embodiments of the invention address these and other problems, individually and collectively.

BRIEF SUMMARY

Embodiments of the disclosure are directed to a system in which an electronic record (e.g., a blockchain) may be generated for an ownership interest within a distributed environment. The electronic record may comprise a number of transaction records that involve multiple users, where the transaction records are each associated with a transfer of the ownership interest. Transaction records may be associated with an item and may be appended to a ledger associated with that item as they are received by the blockchain network.

One embodiment of the invention is directed to a method comprising receiving a request to perform an action with respect to an item, the request including at least an item identifier, identifying, based on the item identifier, a blockchain associated with the item, the blockchain including a series of transaction records, identifying, from a transaction record of the series of transaction records, a contact information for a current owner of the item, providing a notification of the requested action to the current owner via the contact information, completing the requested action upon receiving a response to the notification, generating a new transaction record based on the action, and appending the new transaction record to the blockchain.

Another embodiment of the invention is directed to a processing node comprising one or more processors, and a memory including instructions that, when executed by the one or more processors, cause the processing node to: receive a request to perform an action with respect to an item, the request including at least an item identifier, identify, based on the item identifier, a blockchain associated with the item, the blockchain including a series of transaction records, identify, from a transaction record of the series of transaction records, a contact information for a current owner of the item, provide a notification of the requested action to the current owner via the contact information, complete the requested action upon receiving a response to the notification, generate a new transaction record based on the action, and append the new transaction record to the blockchain.

Another embodiment of the invention is directed to a client device comprising at least one input sensor, one or more processors, and a memory including instructions that, when executed by the one or more processors, cause the client device to: obtain, via the at least one input sensor, an identifier for an item, generate, based on input received from a user of the client device, a request to perform an action with respect to the item, the request including at least the identifier, transmit the request to an item registry network, the request causing the item registry network to: identify an item registry associated with the item from a plurality of item registries, the item registry including a series of transaction records, and complete the action with respect to the item using information included in at least one transaction record of the series of transaction records. The instructions further causing the client device to receive a response to the request that indicates completion of the action.

These and other embodiments of the invention are described in further detail below.

DETAILED DESCRIPTION

Figure 1:
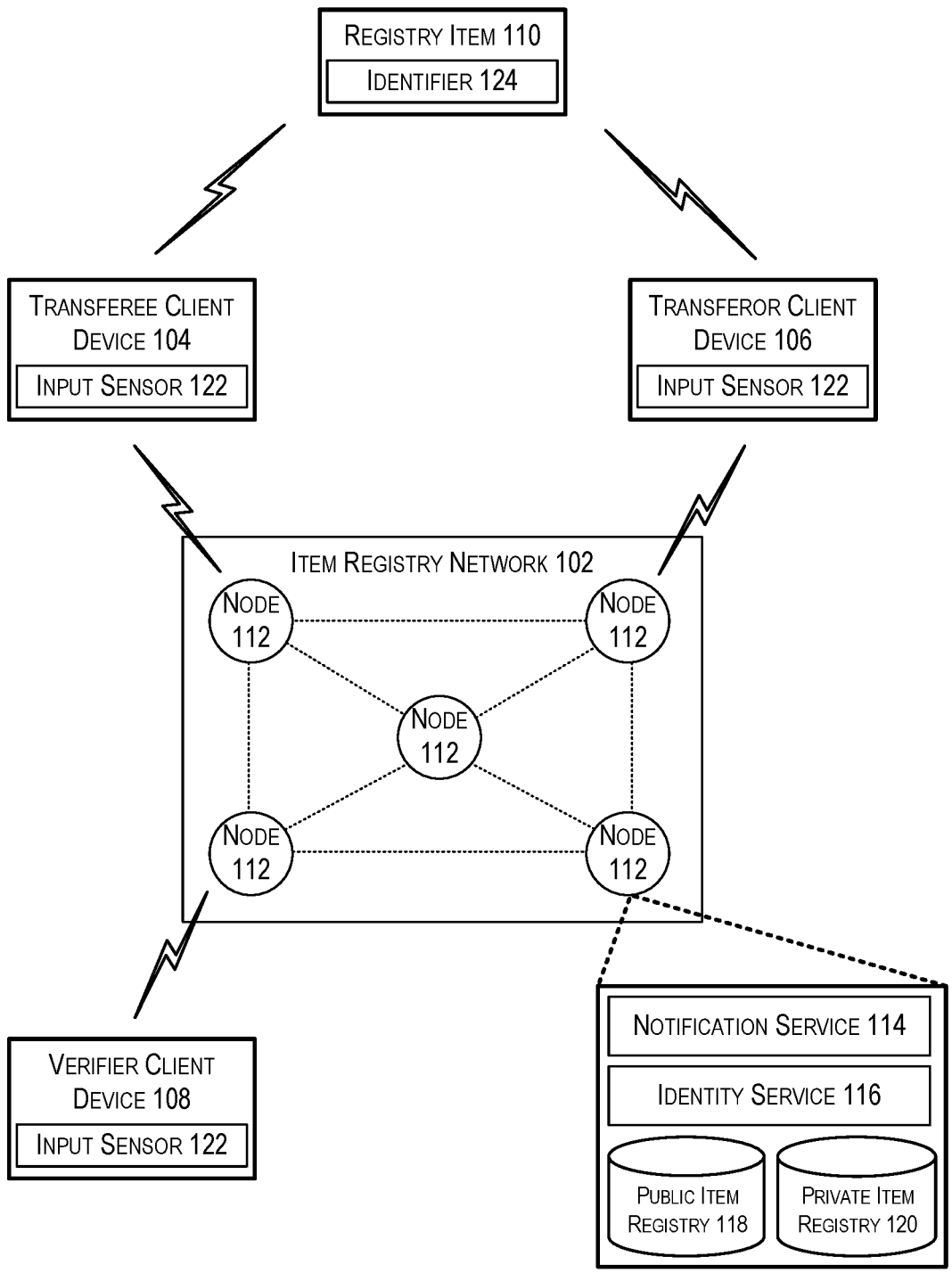
FIG. 1 depicts a block diagram of an exemplary system in which an electronic record associated with an item may be maintained within a distributed environment in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

An "application server" may be any computing device configured to provide remote support for a client device. The application server may be associated with a set of computer executable instructions to be installed on, and executed from, a client device (e.g., a mobile application). The application server may provide any suitable service and/or processing for the client device. For example, the application server may perform calculations on behalf of the client device. In some embodiments, the application server may maintain an account for one or more users. The application server may also store any protocols and/or user preferences related to the operation of the client device.

A "blockchain network" may be a distributed database that maintains a continuously-growing list of records secured from tampering and revision. A blockchain may include a number of blocks of transaction records for a number of users. Each block in the blockchain can also contain a timestamp and a link to a previous block. Stated differently, transaction records in a blockchain may be stored in an electronic records as a series of "blocks," or permanent files that include a record of a number of transactions occurring over a given period of time. Blocks may be appended to a blockchain by an appropriate node after it completes the block and the block is validated. In embodiments of the invention, a blockchain may be distributed, and a copy of the blockchain may be maintained at each node in a blockchain network. Any node within the blockchain network may subsequently use the blockchain to verify transactions.

A "client device" may be any electronic device capable of establishing a communication session with another electronic device (e.g., an application server) and transmitting/receiving data from that device. A client device may include the ability to download and/or execute mobile applications. Client devices may include mobile communication devices as well as personal computers and thin-client devices.

A "cryptographic key" may be any string of bits used by a cryptographic algorithm to transform plain text into cipher text or vice versa. Cryptographic keys may include symmetric and asymmetric keys. A cryptographic key may be used to sign transactions and/or verify signed transactions. For example, a cryptocurrency transaction may be signed using a private key. The signed transaction may then be verified using a public key that corresponds to the private key.

An "item identifier" may be any suitable string of characters or symbols used to uniquely identify an item (e.g., a tangible or intangible asset) within a computerized environment. In some embodiments, the item identifier may be a value calculated by hashing one or more input values related to the item. In this way, the item identifier may be independently generated by any entity that has the prerequisite information (e.g., an entity in possession of the item). In some embodiments, the item identifier may correspond to a Universal Product Code (UPC) and serial number or other identifier. Some items may include an indication of their respective item identifiers (e.g., within a barcode or other machine-readable code associated with the item).

An "electronic record" may be any record of transactions stored electronically. For example, an electronic record may comprise a number of transaction records associated with a particular item identifier/item. In some embodiments, an electronic record may be compiled by identifying each of the transaction records recorded in a distributed environment that are associated with a particular item identifier. In some embodiments, the electronic record may include a portion generated by, and signed using a private key associated with, the user with which a transaction is associated. In some embodiments, the electronic record may be in the form of a blockchain ledger.

A "ledger" or "item registry" may be any electronic record that includes transaction records for a user. In some embodiments, a ledger may be an electronic record which is generated by a blockchain network such that, as transaction records are appended to the ledger, they are linked to previous transaction records and signed using a private key. The authenticity of an entry of the ledger may then be verified by any entity in possession of the transaction record information and a public key associated with the private key.

A "mobile communication device" may be any portable electronic device that has a primary function related to communication. For example, a mobile communication device may be a smart phone, a personal data assistant (PDA), or any other suitable handheld device. The mobile communication device may be configured to input cryptocurrency addresses and display any received aliases. In some embodiments, the mobile communication device may be configured to store a private key to be associated with a cryptocurrency address and/or alias.

A "private key" is a type of cryptographic key that is kept secret by a party. A private key may be used to sign transactions such that they may be verified using the blockchain network.

A "public key" may be a type of cryptographic key that is distributed to, or available to, some entity other than a party holding a corresponding private key. In some embodiments, the key may be publically available, while in other cases it may be distributed to nodes in a network, but the network itself may not be accessible to the general public. A public key may be made available to nodes of a blockchain network and/or resource providers so that signed transactions associated with the public key may be verified by the nodes.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "transaction record" may be any indication of a transaction conducted with respect to an item for which a ledger is maintained. A transaction record may include a number of details related to the transaction conducted. For example, the transaction record may include an indication as to the parties involved in the transaction, the type of transaction conducted, an amount for which the transaction has been conducted, or any other suitable information.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing. In some examples of verification described in the disclosure, electronic records may be signed using a private key and verified using a public key.

Details of some embodiments of the present invention will now be described.

FIG. 1 depicts a block diagram of an exemplary system in which an electronic record associated with an item may be maintained within a distributed environment in accordance with at least some embodiments. In FIG. 1, a number of client devices may be in communication with an item registry network 102 via a network connection. Each of the number of client devices may perform different roles within the system at any given time. By way of non-limiting example, a client device may act as a transferee client device 104, a transferor client device 106, or a verifier client device 108. The item registry network 102 may maintain a number of global registries, each of which is used to record transactions related to a registry item 110.

In some embodiments, the item registry network 102 may be a blockchain network. A blockchain network may include a distributed environment implemented across number of blockchain nodes 112, each of which represents a computing system or component. An example of a blockchain node 112 that may be implemented in accordance with various embodiments is described in greater detail with respect to FIG. 2. A copy of a blockchain (a record of electronic records) may be distributed to each blockchain node 112 within the item registry network 102. In some embodiments, at least some of the blockchain nodes 112 may each be owned and/or operated by at least one of a service provider entity or a resource provider entity. In some embodiments, the item registry network 102 may comprise a number of computing devices operated by entities that each belong to a particular group or have obtained a particular certification. Additionally, one or more of the blockchain nodes 112 may be an administrative node. An administrative node may be a blockchain node 112 which is operated by a service provider that operates the item registry network 102 and has a greater level of permissions than other blockchain nodes 112. For example, in some embodiments, only an administrative node may sign transaction records using a private key associated with the service provider. In some embodiments, each of the blockchain nodes of the item registry network 102 may be operated by a single entity. In some embodiments, one or more of the blockchain nodes of the item registry network 102 may be operated by different entities that participate in the item registry network 102.

The blockchain nodes 112 of the item registry network 102 may include some combination of edge nodes and processing nodes. An edge node may be any computing device configured to provide egress/ingress to the item registry network 102. In some embodiments, an edge node may be configured to determine whether an entity is authorized to participate in the item registry network 102. The processing nodes 112 may be any computing device configured to perform at least a portion of the functionality described herein. A processing node 112 may be configured to perform registry update/verification actions in accordance with embodiments described herein. In some embodiments, each processing node of the item registry network 102 may be configured to perform at least a notification service 114 and/or an identity service 116. Additionally, global registries, or other electronic records, may be distributed to each processing node of the item registry network 102. In some cases, this may include public global registries 118 and/or private global registries 120. At least a portion of the data stored within an item registry may be encrypted.

A client device 104, 106, or 108 may comprise any suitable computing device capable of receiving input related to a registry item 110 (e.g., via an input sensor 122) and interacting with the item registry network 102. The client device 102 may include at least a processor and a memory. The memory of the client device may include computer-executable instructions that cause the processor to perform certain functions in accordance with embodiments of this disclosure. For example, the memory may include a mobile application that causes the mobile device to initiate a transaction using the received input related to the registry item.

In some embodiments, the memory of the client device may include a secure execution environment such as a secure memory (e.g., Smartcard based technology available in low-power devices). In some embodiments, the secure memory may include a secure element. A secure element (SE) can be a tamper-resistant platform (typically a one chip secure microcontroller) capable of securely hosting applications and their confidential and cryptographic data (e.g. key management) in accordance with the rules and security requirements set forth by a set of well-identified trusted authorities. Sensitive information (e.g., user data) received by, and stored upon, the client device may be stored in the secure memory.

In some embodiments, at least a portion of the functionality performed by a mobile application installed upon, and executed from, the client device may be performed by a mobile application server in communication with the mobile application. For example, upon execution of a mobile application, the client device may establish a communication session with an application server in which at least some processing is performed by the application server on behalf of the mobile application. In some embodiments, the application server may maintain an account associated with the client device and/or its user. The account maintained by the application server may store a number of data elements related to the user. For example, the application server may store user data, information on item ownership (e.g., an item registry), or any other suitable data. The application server may, upon receiving a request from the client device executing the mobile application, initiate a transaction with the item registry network 102 on behalf of the client device.

As pointed out above, the client device may perform different roles within the system at any given time. In some embodiments, a client device may act as a transferee client device 104, a transferor client device 106, or a verifier client device 108 depending on the context in which it is being used. It should be noted that the client device may perform one role in a first transaction and a different role in a second transaction.

A transferee client device 104 may be a client device which communicates with the item registry network 102 to obtain an ownership interest in a registry item 110. In some embodiments, a transaction to transfer an ownership interest in a registry item 110 may be initiated via a transferee client device 104. For example, an identifier for the registry item 110 may be input into the transferee client device 104 via an input sensor 122. In some embodiments, the input sensor 122 may be a keypad and the identifier 124 may be manually entered via the keypad by the user of the transferee client device 104. In some embodiments, the input sensor may be a barcode reader and the identifier 124 may be presented in the form of a machine-readable code. Upon receiving the identifier 124, the transferee client device 104 may initiate a transaction for a transfer of ownership by communicating the identifier 124, as well as an indication of the transferee client device 104, to the item registry network 102. The transferee client device 104 may then receive a notification from the item registry network 102 as to whether the transaction has been approved or declined.

A transferor client device 106 may be a client device which communicates with the item registry network 102 to divest an ownership interest in a registry item 110. In some embodiments, a node 112 of the item registry network 102 may communicate with the transferor client device 106 regarding a transaction initiated with respect to a registry item 110. For example, the transferor client device 106 may receive a notification that a transaction has been initiated with respect to a particular item which is currently owned by the user of the transferor client device 106. The notification may include a number of details related to the registry item 110 so that the user of the transferor client device 106 is able to verify that the item being transferred is the correct item. The user of the transferor client device 106 is then able to provide a response to the notification indicating whether or not the transaction should be approved or declined. In some embodiments, a transaction to transfer ownership of a registry item 110 may be initiated using the transferor client device 106. For example, the transferor client device 106 may receive, via an input sensor 122, an identifier 124 for the registry item 110 as well as an indication of a user to which ownership should be transferred. In this example, the transferor client device 106 may relay the information to the item registry network 102, which may initiate a transfer of ownership for the registry item 110 to the indicated user.

A verifier client device 108 may be a client device configured to verify a current ownership status for a registry item 110. In some embodiments, a transaction to verify an ownership status for a registry item 110 may be initiated via a verifier client device 108. For example, an identifier for the registry item 110 may be input into the verifier client device 108 via an input sensor 122 and subsequently transmitted to the item registry network 102. The verifier client device 108 may then receive a notification from the item registry network 102 as to whether the registry item 110 is currently stolen. In some embodiments, the verifier client device 108 may receive an indication of a current owner of the registry item 110. In some embodiments, a verifier client device 108 may be able to access different types of information based on a user of the verifier client device 108. For example, a typical verifier client device 108 may not have access to a current owner's information and may be limited to receiving only an indication as to whether the item is currently stolen. However, a verifier client device 108 operated by a law enforcement entity may have access to a current owner's complete information. In some embodiments the owner would control who is allowed to access the owner's information and which elements are accessible.

In some embodiments, the client device may include a communication interface configured to enable communication between the client device and another electronic device (e.g., a blockchain node 112, an application server, and/or a wireless router that manages access to a network). Examples of a suitable communication interface may include radio frequency (RF) transceivers configured to send and receive communications using near-field communications (NFC), or other radio frequency or wireless communication protocols such as Bluetooth, Bluetooth low-energy (BLE), a wireless local area network (e.g., WiFi), iBeacon, etc. In some embodiments, the communication interface may include both long range and short range communication means. For example, the communication interface may include an antenna configured to connect to a cellular network in order to enable communication with various other components of the depicted architecture.

A registry item 110 may be any item (tangible or intangible) for which an ownership interest may exist. In some embodiments, an item registry may be maintained for each registry item 110. In some embodiments, an item registry may be maintained for a particular type of registry item. For example, an item registry may be maintained for vehicles. In some embodiments, multiple global registries may be maintained for a registry item 110. For example, separate private and public global registries may be maintained for an item, wherein the private item registry includes information unavailable via the public item registry, but may only be accessed by an authorized entity. A registry item 110 may include an indication of an identifier 124. In some embodiments, an identifier may include any information related to the item. For example, the identifier may include an indication of a type of the item as well as a serial number for the item.

In some embodiments, an item registry may be created, or otherwise generated within the item registry network 102, by a resource provider computer. The resource provider computer may comprise any suitable computing device operated on behalf of a resource provider entity (e.g., a merchant) which is capable of providing access to one or more resources. In some embodiments, each resource provider computer may maintain a respective database that includes transaction data and/or item registries. The transaction data may include records of transactions conducted between the resource provider computer and a number of users.

In some embodiments, a resource provider computer and/or application server may be a blockchain node 112, having access to, and participating in the operation of, the item registry network 102. In some embodiments, one or more entities may not have access to the item registry network 102, but may be provided with a public key that may be used to verify electronic records associated with the item registry network 102. For example, in some embodiments, a client device may be capable of verifying a transaction transferring ownership of a registry item 110 without having the ability to participate in the item registry network 102.

By way of illustrating interactions between various components of the system described herein, consider a scenario in which a first user wishes to transfer an ownership interest in a registry item 110 to a second user while remaining relatively anonymous. In this example, the second user may execute a mobile application on his or her mobile device and scan a barcode or other identifier 124 on the object. The mobile application on the second user's client device (i.e., the transferee client device 104) may then communicate the identifier for the item to the item registry network 102 along with an indication of the second user. In this example, a node 112 of the item registry network 102 may identify an item registry blockchain associated with the scanned item. The node 112 of the item registry network 102 may identify contact information for the first user from that item registry blockchain and may provide a notification to the first user's client device (i.e., the transferor client device 106). Upon receiving the notification, the first user may elect to approve or decline the transaction for the transfer of ownership. If the first user approves the transaction, then a transaction record for the transaction may be generated and appended to the item registry blockchain. This transaction record may be signed using a private key. In some embodiments, the transaction record is signed using a private key associated with the first user. In some embodiments, the transaction record is signed using a private key associated with the item registry network 102. Once the transaction record has been appended to the item registry blockchain and signed, ownership of the registry item 110 is transferred from the first user to the second user. It should be noted that at least partial anonymity may be maintained throughout the transaction by withholding any information about the first or second user from either of those parties.

A current ownership status of the registry item 110 may be checked at any time. For example, if the second user brings the registry item 110 to a pawn shop, then the pawn shop employee may verify that the second user is actually the owner of the registry item 110 (e.g., by using his/her client device as a verifier client device). It should be noted that this process may also be performed at least partially anonymously. For example, the pawn shop employee may scan, or otherwise input, details of the registry item 110, which are then conveyed to the item registry network 102. In this example, a node 112 of the item registry network 102 may identify the item registry blockchain associated with the registry item 110. The node 112 of the item registry network 102 may identify contact information for the second user (as the current owner) from that item registry blockchain and may provide a notification to the second user's client device. The second user may then indicate that the registry item 110 is not currently stolen. Upon receiving a response from the second user's client device, the item registry network 102 may provide a notification to the pawn shop employee that the item is not currently stolen.

In some embodiments, statuses of the item other than an ownership status may be verified using the disclosed system. For example, a verifier client device 108 may be used to verify the authenticity of a particular item. For example, a luxury item may be associated with a unique item identifier by the item's manufacturer. In this example, a user may verify not only that the item is not stolen, but that it is an authentic version of the item (as opposed to a counterfeit). In another example, in the case that the item is a house or vehicle, a verifier client device 108 may be used to check historical data for the item. By way of illustration, the verifier client device 108 may be used to check a house's insurance claim history or a vehicle's maintenance/accident record. It is envisioned that any number of types of information may be stored in a transaction record within an item registry, each of which may provide information relevant to the item.

In some embodiments, record data maintained by the item registry network 102 may be stored anonymously (e.g., such that it is not easily associated with a particular user or account holder). For example, the record data may comprise a number of resource locator addresses that reference user data without an indication of the user. In some embodiments, the item registry network 102 may store a record of a user related to each resource locator address in a separate data store (e.g., in a database table). In some embodiments, an item registry may include only contact information for an item within the item registry (e.g., a phone number or email address), such that a current owner of an item cannot easily be identified. In some cases, the user information may be encrypted, such that it may only be accessed by a blockchain node 112 of the item registry network 102.

In accordance with at least some embodiments, the item registry network 102 may comprise a federated and/or permission-based environment. For example, in order to participate in, or use, the item registry network 102, an entity may need to be certified or otherwise authenticated. For example, the item registry network 102 may require that each entity be subject to trust services management (TSM) policies and/or rules. In some examples, different entities may be subject to different policies based on the type of entity that it is. For example, servers associated with a resource provider may be trusted automatically, whereas servers associated with an individual may need to receive certification from a resource provider. In these examples, only trusted entities may have access to, or participate in, the item registry network 102.

Some embodiments of the system described herein may require mandatory participation. For example, in the case that a user purchases a firearm or other weapon, an item registry may be generated for that particular firearm. Transfers of an ownership interest in the firearm may be recorded in that item registry so that law enforcement officials can easily check the current ownership status of the firearm. In some embodiments, the system may act as an automatic registration system. For example, a user may elect to participate in the system by providing an indication to an issuer of their payment device. In this example, any items involved in a transaction conducted using the payment device may automatically be registered to that user.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications policy.

Figure 2:
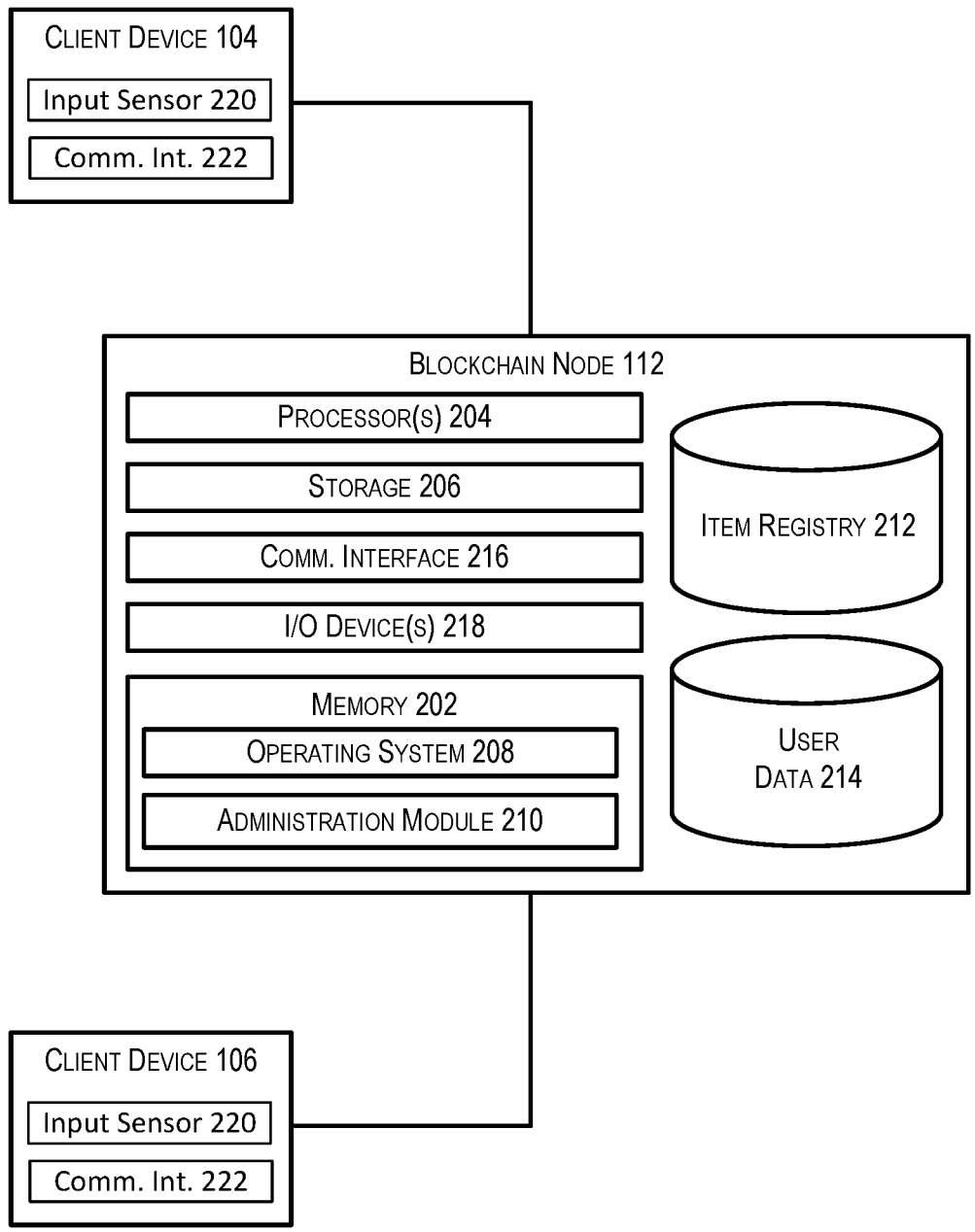
FIG. 2 depicts a diagram of an exemplary blockchain node 112 and two exemplary client devices 104 and 106 in accordance with at least some embodiments.

FIG. 2 depicts a diagram of an exemplary blockchain node 112 and two exemplary client devices 104 and 106 in accordance with at least some embodiments. The blockchain node 112 may be an example blockchain node 112 of FIG. 1. The client devices 104 and 106 may be example respective client devices 104 and 106 of FIG. 1.

The blockchain node 112 may be any type of computing device capable of receiving an item identifier from a client device, identifying an item registry associated with the item, communicating with a second client device, updating the item registry to include a transaction record, signing the item registry using a private key, and distributing the item registry to other blockchain nodes within an item registry network. In at least some embodiments, the blockchain node 112 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202, or any other memory described herein, may store program instructions that are loadable and executable on the processors, as well as data generated during the execution of these program instructions. The memory may be volatile (such as random access memory (RAM)) and/or non-volatile (such as read-only memory (ROM), flash memory, etc.). The blockchain node 112 may also include additional storage 206, such as either removable storage or non-removable storage including, but not limited to, magnetic storage, solid-state storage, optical disks, and/or tape storage. The disk drives and their associated computer-readable media may provide non-volatile storage of computer-readable instructions, data structures, program modules, and other data for the blockchain node 112. In some embodiments, the memory 202 may include multiple different types of memory, such as static random access memory (SRAM), dynamic random access memory (DRAM) or ROM.

Turning to the contents of the memory 202 in more detail, the memory 202 may include an operating system 208 and one or more application programs or services for implementing the features disclosed herein including at least a module for generating and managing electronic records associated with items (administration module 210). The memory 202 may also include item registry data 212, which provides data associated with an item's transaction history and user data 214, which provides data associated with a user and/or account.

In some embodiments, the administration module 210 may, in conjunction with the processor 204, be configured to perform at least one of a notification service or an identity service. The administration module 210 may receive a request from a client device to obtain a status related to, or cause a transfer of, an ownership interest in an item. In some embodiments, the request may include an identifier for the item. Upon receiving the request, the administration module 210 may be configured to identify an item registry (which may be a blockchain) associated with the item. From the identified item registry, the administration module 210 may determine the current owner of the item. For example, the current owner may be identified from the most recent transaction record related to a transfer of ownership. In some embodiments, a transaction record may also include contact information for the current owner. In some embodiments, the administration module 210 may retrieve user information from a database table related to the current owner. Once the current owner's contact information has been retrieved, the administration module 210 may be configured to provide a notification to a client device associated with the current owner using the contact information.

Once the administration module 210 has sent a notification to the client device associated with the current owner, the current owner may be given the opportunity to respond to the notification. In some embodiments, the notification may be provided as a push notification or short messaging service (SMS) message. Upon receiving a response from the item's owner, the administration module 210 may complete or cancel the requested transaction based on the received response. This is discussed in greater detail with respect to FIG. 3.

The blockchain node 112 may also contain communications interface(s) 216 that enable the respective server to communicate with a stored database, another computing device or server, one or more remote devices, and/or any other suitable electronic devices. In some embodiments, the communication interface 216 may enable the server to communicate with other electronic devices on a network (e.g., on a private network). The blockchain node 112 may also include input/output (I/O) device(s) and/or ports 218, such as for enabling connection with a keyboard, a mouse, a pen, a voice input device, a touch input device, a display, speakers, a printer, etc.

The client devices 104 and 106 may be any type of computing device capable of receiving input related to an item and communicating with the blockchain node 112. The client devices 104 and 106 may each include a memory and one or more processing units (or processors). The client devices 104 and 106 may be the same type of client device or different types of client devices. A client device may include a number of input sensors 220 which may be used to obtain an item identifier. In some embodiments, the input sensors 220 may include a camera device and the client device may use one or more machine vision techniques to obtain the identifier. For example, the client device may use optical character recognition (OCR) to identify a serial number or other identifier marked on an item. In some embodiments, the input sensors 220 may include a barcode reader that may be used to scan a machine-readable code related to the item. Additionally, a client device may include a communications interface 222 that enables the client device to communicate with any other suitable electronic devices (e.g., the blockchain node 112).

Figure 3:
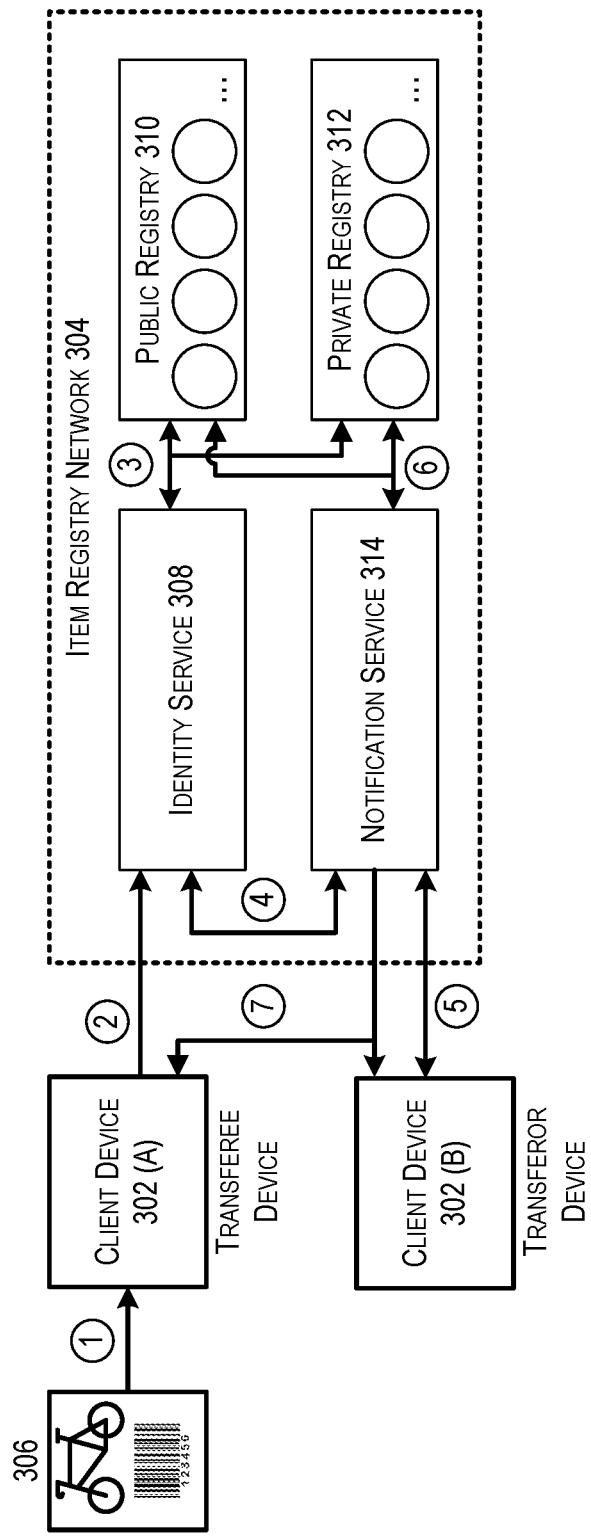
FIG. 3 depicts an illustrative example of a process 300 that may be performed to verify/transfer an ownership interest for a registry item in accordance with at least some embodiments of the disclosure.

FIG. 3 depicts an illustrative example of a process 300 that may be performed to verify/transfer an ownership interest for a registry item in accordance with at least some embodiments of the disclosure. In FIG. 3, multiple client devices 302 (A and B) may be in communication with a registry network 304 having a number of blockchain node servers. In some embodiments, at least some of either the blockchain node servers of the registry network 304 or the client devices 302 may be resource provider computers.

At step 1 of the process 300, an operator of client device 302 (A) may determine that he or she is interested in gaining ownership of, or checking on an ownership status of, a registry item 306. In some embodiments, the operator of the client device 302 (A) may enter an identifier for the item into a mobile application executed upon the client device 302 (A) via a keypad. In some embodiments, the operator of the client device 302 (A) may scan a machine-readable code using a scanning device of the client device 302 (A) in order to automatically input the identifier for the item 306. The machine readable code may be located on the item or on packaging associated with the item 306. In some embodiments, a format or content of the identifier may be associated with a type or category of item. In at least some of these embodiments, upon receiving the identifier for the item 306, the client device 302 (A) may determine the particular type or category that the item 306 belongs to. For example, the client device 302 (A) may, upon receiving an identifier associated with a bicycle, determine that the item 306 is a bicycle based on the format of the received identifier. In some embodiments, the system may query a database table to identify a particular item associated with an identifier.

At step 2 of the process 300, the client device 302 (A) may transmit the identifier to a processing node of the registry network 304. Upon receiving that identifier, the processing node may initiate an identity service 308 request to identify the item and the current owner of that item. To do this, the identity service may first locate an item registry associated with the item. An item registry may be a blockchain which includes a number of transaction records associated with the item. In some embodiments, the item may be associated with both a public registry 310 and a private registry 312. In some embodiments, the item 306 may be associated with a single registry, at least a portion of the data stored within which is encrypted. For example, at least a portion of the information related to a user (e.g., a current owner of the item) may be encrypted such that it may only be accessed by a processing node of the item registry network 304 or other authorized entity. The item registry for a particular item may be stored in association with the item identifier or some identifier derived from the item identifier (e.g., a hash value). In some embodiments, the request may include an indication of a payment account to be used in completing the requested transaction.

At step 3 of the process 300, the processing node of the item registry network 304 may retrieve at least one of the item registries 310 or 312 associated with the item. In some embodiments, the processing node may first determine a level of access or authorization associated with the requestor. Upon making that determination, the processing node may identify what information, if any, may be provided to the requestor based on the determined role or level of access. In some embodiments, the information to be provided to the requestor may also depend upon the type of the request submitted. For example, if the request is a request for the identity of the current owner of the item, then the processing node may be configured to provide a response with the requested information (if the requestor is authorized). If the request is a request to transfer an ownership interest in the item, then the processing node may not return any information.

The information obtained by the identity server 308 may be obtained from a transaction record in the identified blockchain. In some embodiments, the processing node may analyze the most recent transaction record in the blockchain. In some embodiments, the processing node may analyze the most recent transaction record in the blockchain related to a transfer of ownership. The information obtained by the processing node may include at least a contact information for the current owner. For example, the processing node may identify a phone number or email address at which the current owner may be contacted.

At step 4 of the process 300, the processing node may initiate a notification service 314. The identity service 308 may communicate the current owner's contact information to the notification service 314 and the notification service 314 may generate a message to be transmitted to the current owner via the contact information. The generated message may include an indication as to the requested action (e.g., transfer ownership, check on current ownership status, etc.). In some embodiments, the generated message may also include an indication of a trade item or amount, for which the requestor is willing to offer to gain ownership of the item. This notification service can permit anonymous, but trusted, communication between the current owner and someone interested in an item.

At step 5 of the process 300, the processing node may communicate with a second client device 302 (B) using the contact information provided. In some embodiments, the notification service 314 may be configured to provide a push notification or text message to the client device 302 (B). In at least some embodiments of the disclosure, the user of the client device 302 (B) is able to respond to the generated message. In some cases, the response may be initiated upon the user selecting a button on a graphical user interface (GUI). For example, the client device 302 (B) may display buttons to "Approve" or "Decline" the transaction. In some embodiments, the user of the client device 302 (B) may be given the ability to input text (e.g., into a text input field of the GUI) that will be included in a response. For example, if the action is to obtain current ownership information, then the user may enter his or her name to be provided in the response.

It should be noted that some embodiments of the system may require authentication of the user of the device prior to initiating the requested transaction. In some embodiments, the level of authentication may be varied according to the value of the item. For example, the system may require a strong authentication (e.g., dual factor authentication or better) for items valued at more than a predetermined threshold value (e.g., $50.00) and basic authentication (e.g., single factor authentication) for items valued at under the predetermined threshold value. In some embodiments, the system may require the same level of authentication for any transaction to be completed. It should be noted that basic embodiments of the system described herein incorporate at least single factor authentication as possession of the second client device 302 (B) serves as an authentication factor. In some embodiments, the authentication may be performed locally on the second client device 302 (B). For example, the user may utilize a fingerprint scanner or other input sensor on the second client device 302 (B) to provide biometric or other personal data. In another example, the user may provide a password or PIN on the second client device 302 (B).

In some embodiments, the authentication may be performed by a third party service (e.g., a service unrelated to the other entities described herein). In these embodiments, the notification may be transmitted to the second client device 302 (B) and a user of the second client device 302 (B) may execute a third party mobile application installed upon the second client device 302 (B). The third party mobile application may communicate with a backend server that provides support for the third party mobile application in order to verify the identity of the user of the second client device 302 (B). In some embodiments, the third party mobile application may provide a token that may be used by the system described herein to determine whether the user is authenticated.

At step 6 of the process 300, after receiving a response to the generated message, the processing node may complete the requested transaction by generating a transaction record. The processing node may append the transaction record to one or more item registries. In some embodiments, the processing node may not complete the transaction until one or more additional conditions are met. For example, the transaction may only be completed once the requestor has provided payment. In some embodiments, the item registry network 304 may charge a payment account provided by the requestor. At step 7 of the process 300, at least one of the requestor and/or the current owner may be notified of the completed transaction via the client devices 302 (A and B).

By way of illustrative example, consider the following scenarios in which the system described herein may be implemented. In a first illustrative scenario, a resource provider (e.g., a merchant) may maintain a physical retail location (e.g., a storefront). In this scenario, the resource provider may register each item in the retail location with the item registry network 304. In some cases, an item registry may be created for each item. A user may enter the retail location in order to obtain an item. Upon locating the item, the user may scan a barcode on the item using his or her client device (e.g., a mobile phone). The client device may obtain an identifier associated with the item from the barcode, which it may communicate to the item registry network 304 along with an indication of a payment account to be used in completing a transaction for the item. Upon receiving the item identifier, the item registry network 304 may generate a message to the resource provider to confirm the transaction. The resource provider, in turn, may convey a price (e.g., an amount of currency) of the item to the item registry network 304 in a response to the message. Upon receiving the response, the item registry network 304 may charge the provided payment account for the indicated amount. In some embodiments, the registry network 304 or another computer affiliated with it, may generate an authorization request message with the payment account identifier and a transaction amount. The authorization request message may be transmitted to an issuer of the account via an acquirer and a payment processing network. The issuer may respond with an authorization. A clearing and settlement process may occur at a later time.

Upon completing the transaction using the indicated payment account and in response to receiving the authorization response message, the item registry network 304 may automatically generate a transaction record to be appended to the respective item registry. In addition, the item registry network 304 may generate a receipt for the transaction and transmit that receipt to the user's client device. The user may then present the receipt on the client device to the resource provider to prove ownership of the item.

In a second illustrative example, the user may lose or have the item stolen. In this example, a second user may scan the item to verify an ownership status of the item. In this scenario, the second user may scan a barcode on the item or manually input an identifier for the item (e.g., a serial number) using his or her client device. The client device may then communicate that identifier to the item registry network 304, which may retrieve the item registry associated with the item. In some embodiments, the item registry network 304 may generate a notification to be sent to a current owner's client device via contact information stored in a transaction record of the item registry. In these embodiments, the user may be given the ability to respond to the notification by either providing an identity or allowing the item registry network 304 to provide details of the current owner to the requestor. In other embodiments, if the requestor is authorized to access information about the owner, the item registry network 304 may provide information about the current owner to the requestor. For example, if the request to view a current owner's information is received from a client device associated with a law enforcement entity, then the item registry network 304 may provide personal information for the user to the client device. It should be noted that a process for verification of an ownership status may be performed even if the item is still in possession of the current owner. For example, the owner of the item may present the item to a financial institution as collateral for a line of credit (e.g., a loan). In this example, the financial institution may scan the item to determine whether the item actually belongs to the user that presented it.

Figure 4:
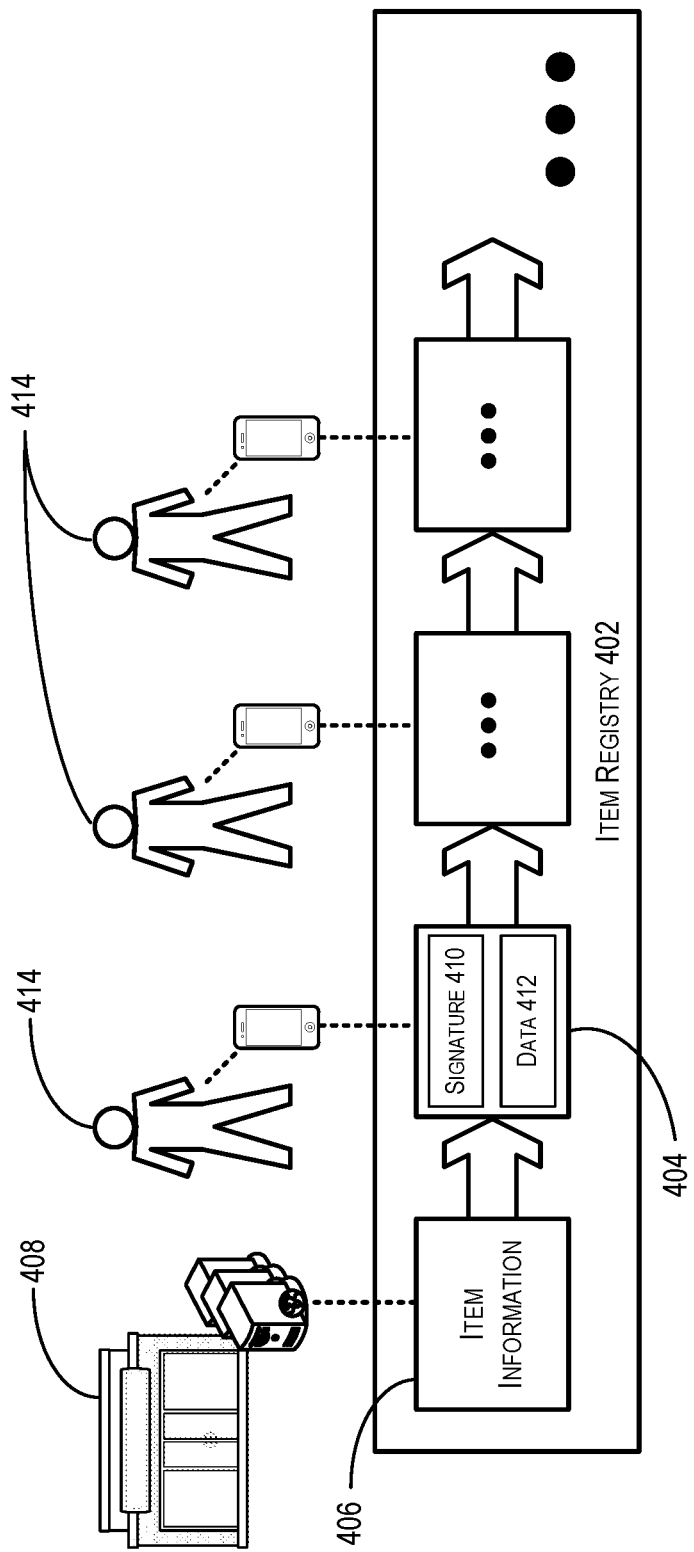
FIG. 4 depicts an example electronic record that may be implemented in relation to a registry item in accordance with at least some embodiments of the disclosure.

FIG. 4 depicts an example electronic record that may be implemented in relation to a registry item in accordance with at least some embodiments of the disclosure. In FIG. 4, an electronic record, and in particular an item registry 402, may comprise a record of transaction records 404 related to a particular item which is distributed across a blockchain network. In some embodiments, the item registry 402 may comprise a blockchain ledger, in which a number of transaction records related to various item transactions are processed in a "block," the record of which is then distributed to a number of nodes of the blockchain network.

As described above, a number of transaction records 404 may be associated with an item registry 402. The item registry 402 may include item information 406, which may be formatted as an item identifier. In some embodiments, the item identifier may be generated with respect to the item, which may be a particular good or service. In some embodiments, the item identifier may be generated using item information provided via a client device or during an item enrollment process. The item identifier may be generated according to a specified format using information related to the item. For example, the item identifier may be generated as some combination of item type and serial number. In some embodiments, the item registry 402 may be generated by a resource provider 408 that initially supplies the item (e.g., a merchant or manufacturer).

As an entity conducts transactions with respect to various items, client devices associated with those entities may generate requests and transmit them to the blockchain network (e.g., an item registry network) to be completed by the blockchain network. Upon completion of a transaction, a new transaction record may be generated and appended to the item registry 402. In some embodiments, each transaction record appended to the item registry 402 may include a signature 410 that may be used to verify the authenticity of the transaction record. The transaction record 404 may also include transaction data 412. In some embodiments, the transaction data 412 included in a transaction record 404 may include information related to the transaction conducted, the entity that conducted the transaction, contact information for that entity, or any other suitable information.

As transactions are conducted with respect to an item registry, a transaction record is generated for that transaction and appended to the item registry. It should be noted that a number of different types of transactions may be recorded in an item registry. For example, in addition to transfers of ownership, the item registry may include transaction records associated with liens, accidents, maintenance, or other events that impact the item. In one illustrative example, an item registry associated with a vehicle may include transaction records indicating maintenance of the vehicle, accidents that the vehicle has been involved in, repairs made to the vehicle, and transfers of ownership for the vehicle. Accordingly, the item registry may constitute an unalterable history of the vehicle. In this way, any party interested in the vehicle (e.g., an insurance agency) may be given complete historical data for the vehicle by accessing the item registry 402.

Each transaction record may be signed using a private key to create a signature 410 for the transaction record. In some embodiments, the transaction record may be signed by a process node of the item registry network using a private key associated with the item registry network. In this way, the transaction record may be verified using a public key associated with the item registry network. In some embodiments, a transaction record may be signed by one of the parties to a transaction (e.g., the current owner) using a private key associated with that party. In this way, the public key associated with the party may be obtained (e.g., from a repository of public keys) and used to verify the authenticity of the transaction record.

Figure 5:
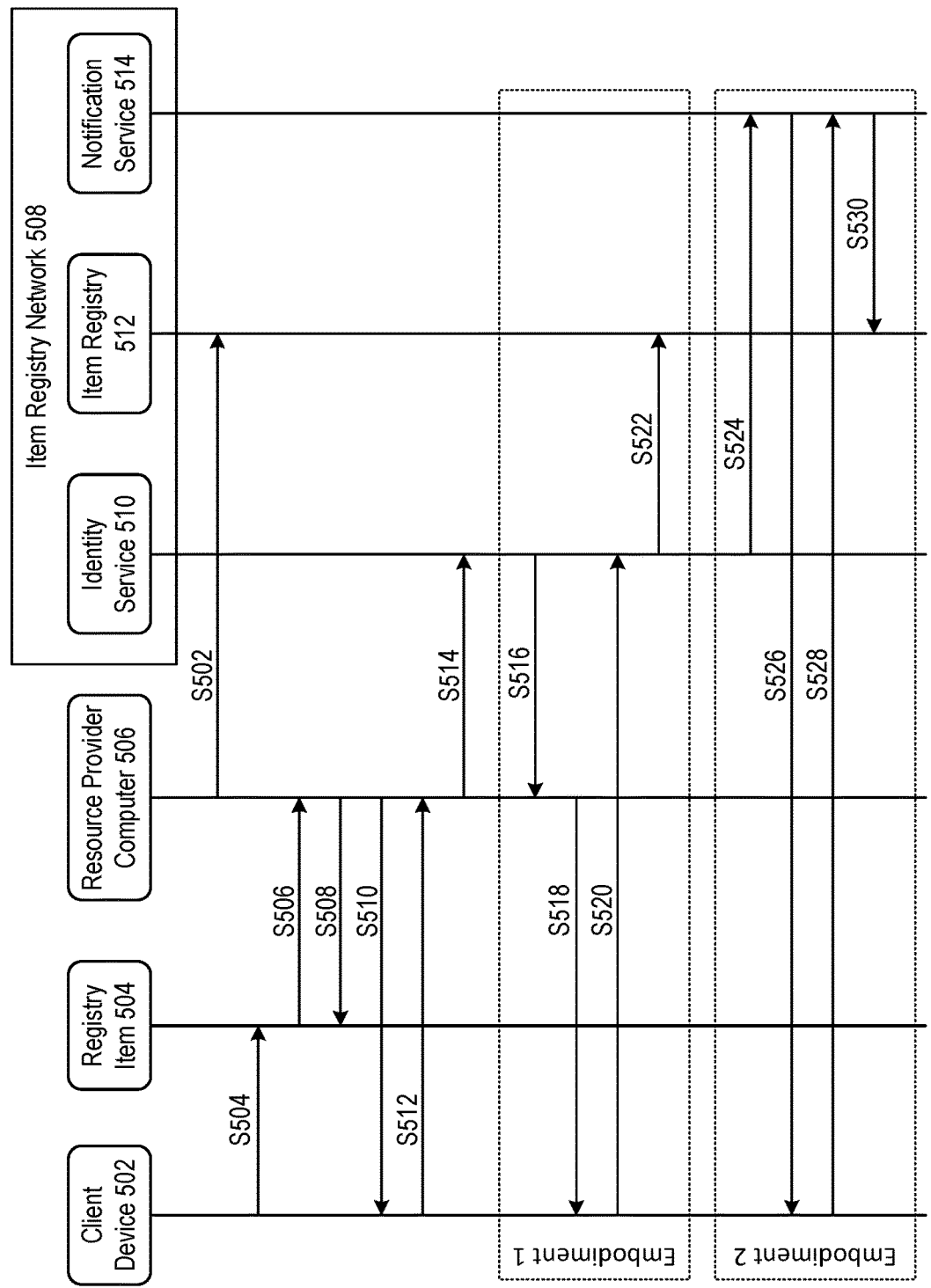
FIG. 5 depicts a first example process 500 for generating an item registry record and transferring an ownership interest in the item that may be implemented in accordance with embodiments of the disclosure.

FIG. 5 depicts a first example process 500 for generating an item registry record and transferring an ownership interest in the item that may be implemented in accordance with embodiments of the disclosure. Some or all of any of the processes described herein (or variations and/or combinations thereof) may be performed under the control of one or more computer systems configured with executable instructions and may be implemented as code (e.g., executable instructions, one or more computer programs or one or more applications). The code may be stored on a computer-readable storage medium, for example, in the form of a computer program including a plurality of instructions executable by one or more processors. The computer-readable storage medium may be non-transitory.

In FIG. 5, various interactions are depicted between several examples of components described throughout this specification. In particular, FIG. 5 depicts a client device 502, which may be used to obtain input related to a registry item 504 provided by a resource provider computer 506. At least one of the client device 502 and the resource provider computer 506 may be in communication with a registry network 508. The item registry network 508 may include at least an identity service 510, an item registry 512, and a notification service 514.

The process 500 may begin at S502, when a registry item 504 is enrolled in the described system by the resource provider 506. In some embodiments, the resource provider may register each registry item that it maintains in an inventory. For example, if the resource provider computer is operated by a retailer, then each item (or each item associated with a value over a threshold value) may be registered in the item registry network 508. In some embodiments, the item registry network 508 may generate an item registry (e.g., a blockchain) for each of the enrolled registry items. In some embodiments, the item registry network 508 may append a transaction record indicating an initial ownership status of the registry item 504 into an item registry 512 that records data for a particular category of item to which the registry item belongs.

At S504, a user may select the registry item 504 for purchase. In some embodiments, the registry item 504 may be selected from a resource provider entity's available stock. The user may select a number of registry items in this manner. At S506, the user may present the registry item to a point-of-sale (POS) terminal in communication with the resource provider computer 506. At S508, an input sensor of the POS terminal may be used to obtain an identifier of the item. In some embodiments, the identifier may be read from a barcode (or other suitable machine readable code). In some embodiments, the enrollment process described at S502 may be performed upon presentation of the item to the POS terminal by the user. For example, the resource provider may receive a number of inventory items that it stores within a warehouse or other suitable storage location without taking possession of the items. In this example, the items may continue to be registered to the manufacturer of the items until the item is purchased from the resource provider. By way of illustration, when a user purchases an item from the resource provider, the resource provider may initiate two separate transactions for the item. In the first transaction, the resource provider may transfer ownership of the item from the manufacturer to itself. The resource provider may then immediately initiate a second transaction to transfer ownership from itself to the user. This may result in two separate transaction records being generated for the item and appended to the item registry. By storing inventory items in this manner, the resource provider may be able to avoid costs/risks associated with item ownership. For example, costs incurred due to inventory shrinkage (e.g., theft or accounting errors) are incurred by the manufacturer as opposed to the resource provider.

At S510, the POS device may request payment for the registry item 504. The user may elect to use payment information stored on the client device 502 to complete the transaction. In some embodiments, the payment information may be a primary account number (PAN) associated with a payment account. In some embodiments, a token service may be executed on the client device in order to provide the POS terminal with a payment token. In some embodiments, the client device 502 may also communicate an identifier or other contact information associated with the client device 502. For example, the client device 502 may relay a mobile phone number, a user's email address, or any other suitable contact information to the resource provider computer 506.

In some embodiments, the POS terminal or another computer affiliated with it, may generate an authorization request message with the payment account identifier and a transaction amount. The authorization request message may be transmitted to an issuer of the account via an acquirer and a payment processing network. The issuer may response with an authorization. A clearing and settlement process may occur at a later time.

At S514, after completing the purchase transaction (e.g., in response to receiving the authorization response message, the resource provider computer 506 may automatically transmit details of the transaction to the item registry network 508 so that the item registry network 508 can record the purchase transaction in the item registry 512. In some embodiments, the resource provider computer 506 may transmit the token or PAN used to complete the transaction. In some embodiments, the resource provider may omit any details that might be used to identify the new owner of the item.

FIG. 5 depicts two non-limiting examples of embodiments which may be implemented in order for a purchaser of an item to claim an ownership interest in the item after completing the purchase described above. The first embodiment is described starting at S516, at which time the item registry network 508 may generate a transaction code to be associated with the transaction record. In some embodiments, the transaction code may be a text string or other identifier that is associated with the transaction record created for the completed purchase transaction. The item registry network 508 may transmit that transaction code to the resource provider computer 506.

At S518, the resource provider computer 506 may relay the transaction code to the client device 502. In some embodiments, the transaction code may be translated into a machine readable code (e.g., a barcode or Quick Response (QR) code), so that it may be scanned using the client device. In some embodiments, a machine readable code may be presented on a display device of the POS terminal. In some embodiments, the machine readable code may be printed on a paper receipt provided to the user of the client device 502. In some embodiments, the transaction code may be wirelessly transmitted to the client device 502 via a wireless transmission (e.g., Bluetooth, WLAN, etc.).

At S520, the client device 502 may communicate the transaction code, as well as contact information for the client device 502 (e.g., a phone number) to the identity service 510 of the item registry network 508. Upon receiving the transaction code and contact information, the identity service 510 may add that contact information to the item registry 512 at S522.

The second example of an embodiment which may be implemented in order for a purchaser of an item to claim an ownership interest in the item after completing the purchase described above is described starting at S524, at which time the identity service of the item registry network may receive a token or other payment account information from the resource provider computer 506. In this example, the identity service 510 may query a repository of payment information or contact an issuer associated with the payment information in order to obtain a contact information for the new owner of the item. The identity service 510 may then convey the contact information to the notification service 514.

At S526, the notification service may generate a message to be transmitted to the client device 502 via the contact information provided by the identity service 510. The message may include an invitation to claim ownership of the registry item 504. In some embodiments, the message may include a request for additional user information to be associated with a transaction record stored in relation to the completed transaction.

At S528, the user may respond to the generated message. In some embodiments, the response may include an indication that the user would like to participate in the item registry network 508. In some embodiments, the response may include additional information for the user that was requested by the notification service 514. Upon receiving the response from the user, the notification service 514 may update the transaction record in the item registry 512 with the received information at S530.

Figure 6:
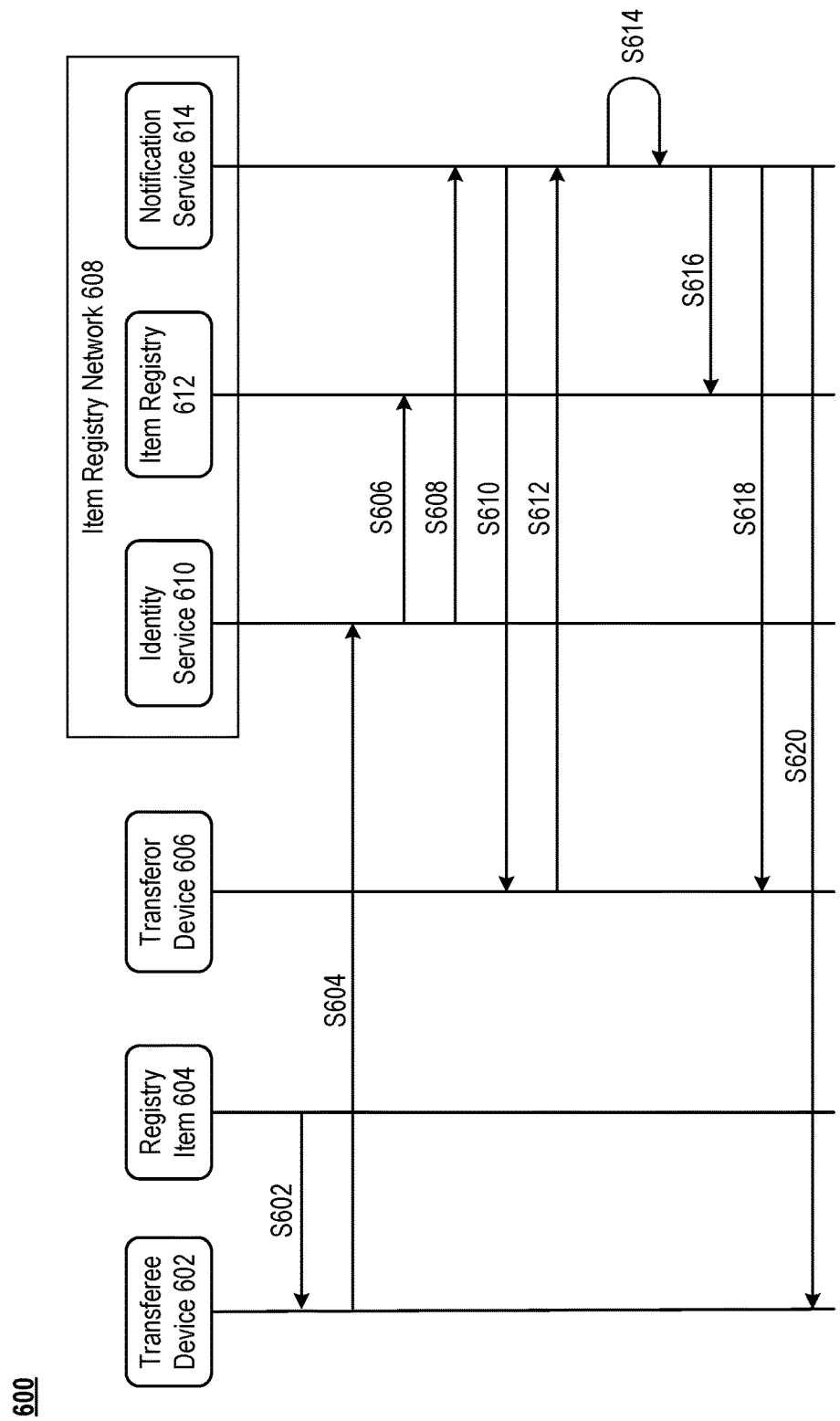
FIG. 6 depicts a second example process 600 for generating an item registry record and transferring an ownership interest in the item that may be implemented in accordance with embodiments of the disclosure.

FIG. 6 depicts a second example process 600 for generating an item registry record and transferring an ownership interest in the item that may be implemented in accordance with embodiments of the disclosure. In FIG. 6, various interactions are depicted between several examples of components described throughout this specification. In particular, FIG. 6 depicts a transferee device 602, which may be used to obtain input related to a registry item 604 which is owned by a user of a transferor device 606. At least one of the transferee device 602 and the transferor device 606 may be in communication with an item registry network 608. The item registry network 608 may include at least an identity service 610, an item registry 612, and a notification service 614.

Process 600 may begin at S602, when a transferee device 602 is provided with an identifier for a registry item 604. In some embodiments, the transferee device may receive the identifier within a text input field associated with a mobile application installed upon, and executed from, the transferor device 602.

At S604, the transferee device 602 may transmit the item identifier to the item registry network 608 in order to initiate a transaction associated with the registry item 604. In some embodiments, the transferee device 602 may also transmit information needed to complete a transaction (e.g., payment information). In some embodiments, the item identifier may be transmitted to a mobile application server that provides backend support for the mobile application installed upon the transferor device 602. In these embodiments, the transferee device 602 may transmit the item identifier to the mobile application server. The mobile application server may identify an account associated with the transferee device 602, retrieve additional information related to the account, and transmit the identifier to the item registry network 608 along with the additional information. In these embodiments, the additional information may be transmitted by the mobile application server over a secure channel and the user need not enter the additional information multiple times (e.g., for each requested transaction).

At S606, the identity service 610 may retrieve an item registry 612 associated with the registry item 604 based on the received item identifier. To do this, the identity service 610 may query a repository of item registries for an item registry 612 associated with the item identifier. In some embodiments, the item registry 612 may be maintained with respect to a particular category or type of the registry item 604. In these embodiments, the identity service 610 may identify the item registry 612 associated with that particular category of item.

At S608, the identity service 610 may determine a contact information for a current owner of the registry item 604 from the item registry 612. To do this, the identity service may analyze at least one transaction record associated with the item identifier. In some cases, this may be the latest transaction record (e.g., the transaction record associated with the latest date) in a series of transaction records associated with the item identifier. The contact information may be provided by the identity service 610 to the notification service 614.

At S610, the notification service 614 may generate a notification message to be provided to the current owner of the registry item 604 based on the requested action. Once generated, the notification message may be transmitted to the transferor device 606 via the contact information. In some embodiments, the notification message may be a text message or SMS message. In some embodiments, the notification message may be a push notification which is pushed to the transferor device 606.

At S612, the transferor device 606 may display the notification message to a user of the transferor device 606. In some embodiments, the contents of the notification message may be displayed within a graphical user interface (GUI) of a mobile application installed upon, and executed from, the transferor device 606. The user of the transferor device 606 may be given the ability to provide input to be transmitted in a response. In some embodiments, the input may include an indication as to whether the transaction is authorized. In some embodiments, the input may include one or more conditions that need to be fulfilled before the transaction can be completed. For example, the user may enter a price at which the item should be purchased. In another example, the user may enter a second item identifier which is associated with an item for which the user would like to trade. The user's input is then transmitted from the transferor device to the item registry network 608 within a response to the notification message.

At S614, the item registry network 608 may determine whether there are any conditions that need to be fulfilled prior to completion of the transaction. For example, the item registry network 608 may determine whether an amount of currency is due for the item. In this example, the notification service 614 may charge the amount due to a payment account provided in the request submitted by the transferee device 602. In this example, the notification service may first transmit an authorization message to the transferee device 602 to obtain permission to bill the amount to the payment information. Once each condition has been fulfilled, the requested transaction may be completed.

At S616, the notification service may update the item registry 612 to include a transaction record associated with the conducted transaction. In some embodiments, the transaction record may include details of the transaction completed as well as a signature. The signature may comprise a hash value of the transaction details which has been signed using a private key associated with the item registry network 608. The signature may be verified using a public key associated with the item registry network 608 by independently generating the hash value from the transaction data in the transaction record. In some embodiments, at least a portion of the transaction details may be encrypted.

At S618 and S620, the notification service 614 may provide a notification to at least one of the transferor device 606 and the transferee device 602. In some embodiments, the notification may include an indication that the transaction has been completed. In some embodiments, the transaction may be a transfer of ownership and the notification may include a receipt for the completed transaction.

Embodiments of the invention provide for a number of technical advantages. For example, an electronic record for a particular item is distributed across a number of remote nodes, which may each be operated by different entities. The electronic record provides an unalterable historical record to be associated with the item. The system enables a quick determination as to a current ownership status of an item as well as the ability to quickly conduct a transaction for an item. In embodiments in which a retailer or other merchant uses the described system, the system enables a user to enter a store operated by that merchant, scan an item, and leave the store without being required to go through a checkout process. Additionally, embodiments of the system may result in lower inventory shrinkage (e.g., theft and accounting errors). For example, if each item is initially registered as being owned by a resource provider, then that resource provider is able to account for each item in its inventory. In the event that a particular item is stolen, the thief may be unable to sell the stolen property, reducing the incentive for theft.

Additionally, in embodiments of this system, two users are able to transfer ownership of an item in an anonymous, or at least partially anonymous, fashion. For example, two parties may record a transfer of title to an item without ever obtaining the other party's identity or any information. This anonymity protects both parties to the transaction in that the transaction is conducted without exposing any personal information to either party. In some cases, the system may only store a phone number or other contact information, limiting the exposure of sensitive data by the system. Even then, this contact information may not be exposed to either of the parties to a transaction, creating a secure and anonymous manner of transferring ownership of items.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. For example, although the described embodiments mention the use of electronic records in order to assess a risk level of an action, an electronic record can also be used to access data or other services. For example, electronic records may be used to gain access to a location or service (e.g., a train ride or concert). In this example, the electronic record may include a transaction record which indicates that a ticket has been associated with an account.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   maintaining, by a processing node of an item registry network, a public blockchain and a private blockchain, wherein each of the public blockchain and the private blockchain include a series of transaction records, and wherein the private blockchain includes sensitive information unavailable via the public blockchain;
   receiving, by the processing node, a request to perform a transaction with respect to an item, the request including at least an item identifier and an action to be performed with respect to the item;
   determining a level of access associated with an originator of the request to perform the action with respect to the item;
   identifying, by the processing node based on the item identifier, a blockchain associated with the item, the blockchain being selected from the public blockchain and the private blockchain based on the determined level of access;
   identifying, by the processing node from a transaction record of the series of transaction records, a contact information for a current owner of the item;
   providing, by the processing node, a notification of the requested transaction to the current owner via the contact information;
   receiving, by the processing node from the current owner, a response indicating whether the transaction should be approved or declined;
   completing, by the processing node, the requested action upon receiving a response to the notification from the current owner that indicates the transaction should be approved, wherein completing the requested action comprises initiating a payment transaction by charging a payment account provided by an originator of the request;
   generating, by the processing node upon receiving an authorization response message for the transaction, a new private transaction record and a new public transaction record based on the action, the new transaction record signed by the processing node using a private key associated with the item registry network, wherein each transaction record of the blockchain is signed using the private key; and
   appending, by the processing node, the new private transaction record to the private blockchain and the new public transaction record to the public blockchain.

2. The method of claim 1, further comprising notifying at least one of the originator of the request or the current owner of a completion of the transaction.

3. The method of claim 2, wherein the action is a transfer of ownership and the notification includes a receipt for the transaction.

4. The method of claim 2, wherein the completion of the transaction is performed anonymously.

5. The method of claim 1, wherein the contact information for the current owner is identified from the latest transaction record in the series of transaction records.

6. The method of claim 1, wherein the contact information comprises at least one of a phone number or an email address.

7. The method of claim 1, wherein the requested action is completed upon detecting that a fulfillment of a condition indicated in the response has been met.

8. The method of claim 1, further comprising determining a level of access to be associated with an originator of the request, wherein the notification of the requested action is provided to the current owner if the level of access is sufficient to authorize the requested action.

9. A processing node of an item registry network comprising:
one or more processors; and
a memory including instructions that, when executed by the one or more processors, cause the processing node to:
maintain a public blockchain and a private blockchain, wherein each of the public blockchain and the private blockchain include a series of transaction records, and wherein the private blockchain includes sensitive information unavailable via the public blockchain;
receive a request to perform a transaction with respect to an item, the request including at least an item identifier and an action to be performed with respect to the item;
determine a level of access associated with an originator of the request to perform the action with respect to the item;
identify, based on the item identifier, a blockchain associated with the item, the blockchain being selected from the public blockchain and the private blockchain based on the determined level of access;
identify, from a transaction record of the series of transaction records, a contact information for a current owner of the item;
provide a notification of the requested transaction to the current owner via the contact information;
receive, from the current owner, a response indicating whether the transaction should be approved or declined;
complete the requested action upon receiving a response to the notification from the current owner that indicates the transaction should be approved, wherein completing the requested action comprises initiating a payment transaction by charging a payment account provided by an originator of the request;
generate, upon receiving an authorization response message for the transaction, a new private transaction record and a new public transaction record based on the action;
sign the new transaction record using a private key associated with the item registry network, wherein each transaction record of the blockchain is signed using the private key; and
append the new private transaction record to the private blockchain and the new public transaction record to the public blockchain.

10. The processing node of claim 8, wherein at least a portion of the information included in the new transaction record is encrypted.

11. The processing node of claim 8, wherein the instructions further cause the processing node to determine whether the originator of the request is authorized to perform the requested action.

12. The processing node of claim 8, wherein the blockchain is selected from at least a public blockchain or a private blockchain.

13. The processing node of claim 12, wherein the blockchain is selected based on a level of access associated with the request.

14. The processing node of claim 12, wherein the current owner is a resource provider.

15. A client device comprising:
at least one input sensor;
one or more processors, and
a memory including instructions that, when executed by the one or more processors, cause the client device to:
obtain, via the at least one input sensor, an identifier for an item;
generate, based on input received from a user of the client device, a request to perform an action with respect to the item, the request including at least the identifier and an identifier for a payment account;
transmit the request to an item registry network, the request causing the item registry network to:
determine a level of access associated with the client device with respect to the item;
identify, based at least in part on the determined level of access, an item registry associated with the item from a plurality of item registries, the plurality of item registries comprising at least a public blockchain and a private blockchain, each of the public blockchain and the private blockchain including a series of transaction records, and wherein the private blockchain includes sensitive information unavailable via the public blockchain; and
complete the action with respect to the item using information included in at least one transaction record of the series of transaction records of the identified item registry by initiating a payment to a current owner of the item using the payment account; and
upon completion of the action, cause the series of transaction records in each of the public blockchain and the private blockchain to be updated by a processing node of an item registry network by appending a new transaction record to the series of transaction records of each of the public blockchain and the private blockchain indicating that a user of the client device is now the owner of the item, each new transaction record signed by the processing node using a private key associated with the item registry network, wherein each transaction record of the series of transaction records is signed using the private key; and
receive a response to the request that indicates completion of the action.

16. The client device of claim 15, wherein the instructions further cause the client device to:

receive, from the item registry network, a notification that includes a second action to be performed with respect to a second item owned by the user of the client device;

receive input from the user indicating that the second action is authorized; and transmit a response to the item registry network that causes it to update the item registry by adding a transaction record indicating the second action.

17. The client device of claim 15, wherein the action is an action to obtain ownership of the item.

18. The client device of claim 17, wherein the response to the request includes a receipt for the item.

19. The client device of claim 15, wherein the instructions are executed via a mobile application installed upon the client device.

20. The client device of claim 15, wherein the at least one input sensor is a barcode scanner.

* * * * *